United States Patent [19]

Haighton et al.

[11] 3,855,254

[45] Dec. 17, 1974

[54] INTERESTERIFICATION PROCESS

[75] Inventors: Adolf Johan Haighton; Hans Robert Kattenberg, both of Vlaardingen, Netherlands

[73] Assignee: Lever Brothers Company, New York, N.Y.

[22] Filed: Mar. 31, 1972

[21] Appl. No.: 240,240

[52] U.S. Cl............... 260/410.7, 426/189, 426/194, 426/339
[51] Int. Cl............................ C11c 3/10, A23d 3/02
[58] Field of Search................................. 260/410.7

[56] References Cited
UNITED STATES PATENTS 2,733,251  1/1956  Hawley et al.................. 260/410.7
2,875,066  2/1959  Holman et al.,..................... 99/122
2,875,067  2/1959  Holman et al...................... 99/122

*Primary Examiner*—Lewis Gotts
*Assistant Examiner*—Diana G. Rivers
*Attorney, Agent, or Firm*—Louis F. Kline, Jr.

[57] ABSTRACT

The reaction rate of a directed interesterification reaction is accelerated by subjecting a glyceride mixture alternately to a temperature of 1°–15°C below the cloud point of a randomised mixture of the same glycerides and to a temperature of at least the cloud point of said randomised mixture. The temperature is cycled at least three times until the cloud point of the mixture obtained is at least 5°C above the cloud point of the randomised mixture.

7 Claims, No Drawings ation of glycerides, especially triglycerides. In catalytic interesterification the fatty acid radicals present in the glycerides, which fatty acids generally differ both in number of carbon atoms and in degree of unsaturation, are rearranged and consequently the melting point, the dilatometric characteristics and other properties of the mixture of glycerides formed differ from those properties of the starting glyceride mixture.

INTERESTERIFICATION PROCESS

BACKGROUND OF THE INVENTION

1. Field of the Invention

The present invention relates to a process for effecting catalytic interesterification of glycerides, especially triglycerides. In catalytic interesterification the fatty acid radicals present in the glycerides, which fatty acids generally differ both in number of carbon atoms and in degree of unsaturation, are rearranged and consequently the melting point, the dilatometric characteristics and other properties of the mixture of glycerides formed differ from those properties of the starting glyceride mixture.

By interesterification is meant the interchange of the fatty acid radicals of the glycerides on the glyceryl radicals in random fashion. This interchange continues dynamically when the oil is in liquid state under the influence of a catalyst until the mixture of molecular configurations reaches an equilibrium in accordance with the laws of probability. The term "molecular configuration" refers to the identity of the fatty acid radicals combined with the glyceryl radical.

Interesterification reactions can be carried out under temperature conditions at which the entire mixture of glycerides is liquid (random interesterification) or partly crystallized (directed interesterification). In the latter type of interesterification reaction the equilibrium in the liquid reaction medium will be disturbed when solid glycerides crystallize out until a new equilibrium under the existing temperature conditions has been reached in said liquid medium.

The invention is especially of advantage for directed interesterification, which reaction, like the random interesterification, is effected in the presence of so-called low temperature catalysts, however, at a temperature at which the higher melting glyceride molecules which are present in the starting glyceride mixture or which are formed during the reaction crystallize out.

By accelerating the reaction rate of interesterification processes more interesterified oils can be produced per unit of time in the same equipment or otherwise smaller reaction vessels are required for producing the same quantity of interesterified oil per unit of time.

2. The Prior Art

From both U.S. Pat. No. 2,733,251 and German Pat. application No. 1,117,986 cycling of the temperature during directed interesterification is in principle known.

In Example 8 and Table 5 of this specification the process of the instant invention and that of U.S. Pat. No. 2,733,251 are compared. From this comparison it followed that both the frequency of cycling and the temperatures used in the prior art are inadequate to provide an acceptable reaction rate acceleration.

In contrast to the process of the instant invention, the glyceride mixtures are subjected to a temperature below the cloud point of the randomised mixtures of the same glycerides for at most two times at extremely short intervals.

SUMMARY OF THE INVENTION

The present invention provides a process for accelerating the directed interesterification reaction of a mixture of glycerides containing fatty acid radicals with 2 to 26 carbon atoms, in which the reaction is carried out at temperatures from −30° to 60°C in the presence of 0.01 to 0.5% by weight of alkali metals or their catalytically active derivatives under conditions at which the glyceride mixture is alternately subjected to a temperature of 1° to 15°C below the cloud point of a randomized mixture of the same glycerides and to a temperature of at least the cloud point of said randomized mixture, whereby the temperature is cycled at least three times until the cloud point of the mixture obtained is at least 5°C above the cloud point of the randomized mixture.

Preferably the temperature of the glyceride mixture is cycled until the cloud point of the mixture obtained is at least 10°C above the cloud point of the randomized mixture.

In this specification by "randomized mixture" is understood a mixture of glycerides which has been subjected to a random interesterification.

The cloud point as used in this specification is determined by the cloud test of the A.O.C.S. Official Method Ce 6-25.

By "cycling" is meant a variation in the temperature above and below the cloud point of the randomized mixture, following a wave pattern with a cycle of at least 25 minutes. It will be understood that the wave needs not necessarily be smooth (e.g., sine) but that other wave forms, such as waves approaching square waves are appropriate.

Preferably the mixture to be directedly interesterified is alternately subjected for 5 to 60 minutes to the temperature below and for 15 to 300 minutes to the temperature at or above the cloud point of the randomized mixture. The upper limit of the highest temperature range is preferably 15°C above the cloud point of the randomized mixture. The reaction temperatures are preferably varied between −10°C and +45°C.

The frequency of cycling the temperature should be chosen in dependence on the reaction time which is required to effect directed interesterification of at least 90% of the reaction mixture.

The mixture of glycerides should be subjected at least three times to alternating temperature conditions, preferably however from 4 to 15 times.

It is an important feature of the invention that products can be prepared containing a substantial proportion of disaturated-monounsaturated triglycerides.

To arrive at an optimal content of said triglycerides, the lowest temperature during cycling should be chosen so that these triglycerides are sufficiently insoluble but substantial crystallisation of monosaturated diunsaturated triglycerides does not take place.

The interesterification catalysts which can be used in the process of the present invention are alkali metals, their alloys or their catalytically active derivatives, e.g., in an amount of 0.01 to 0.5% by weight of the glyceride mixture.

Suitable interesterification catalysts are alkali metals, e.g., sodium and potassium, their hydroxides or their alcoholates (alkoxides), which catalysts are preferably used in proportions of from 0.02 to 0.3% by weight.

Although the alkali metals and/or derivatives are generally called "catalysts" or "low temperature catalysts," the nature of the active catalyst in the reaction is not yet fully understood. In this specification by "catalysts" or "low temperature catalysts" are therefore to be understood the alkali metals, their alloys or their above-mentioned derivatives as well as the catalytically active reaction products which may be formed in situ from said "catalysts" during the interesterification treatment.

The process of the invention can be carried out batchwise or continuously.

A batch of directedly interesterified oil can, e.g., be prepared in a double-walled vessel provided with a stirrer. The temperature of the vessel, in which on top of the oil/catalyst mixture a cushion of dry nitrogen is present, can be varied, e.g., by supplying alternately a warm and a cold heat exchanging liquid through the double wall. This can be effected by means of magnetic valves which are connected to two time relays which in turn are adjusted to two cryomats baths.

Continuously the process can be carried out by passing a stream of oil containing the catalyst alternately through various scraped surface heat exchangers adjusted to the required high and low temperatures.

Such heat exchangers are preferably provided with stirrers and should be of sufficient capacity to give the mixture to be interesterified the required residence times.

The glycerides, preferably triglycerides, to be treated according to this invention contain acid radicals including both saturated and unsaturated fatty acids with 2 to 26 carbon atoms.

The triglycerides are generally called "oils" or "fats," and for the purpose of the invention by "oils" are meant both the triglycerides which are solid at ambient temperature, i.e., about 15°-25°C and which are usually termed "fats" and the triglycerides which are liquid at ambient temperature and which are usually referred to as "oils."

The invention can advantageously be applied to directed interesterification of all kinds of glyceride mixtures.

A significant improvement in reaction rate has been observed by applying the process of the invention to solid fats, e.g., tallow or lard.

Preferably, however, the invention is applied to the directed interesterification of glyceride mixtures which are liquid at ambient temperature and contain a high content of so-called essential fatty acids.

It is a particular advantage of the invention that glyceride mixtures obtained from the directed interesterification of such liquid oils contain so much high-melting triglycerides that these mixtures can be used in the preparation of margarines without addition or with addition of less solid fat than was hitherto possible.

The novel directedly interesterified liquid oils, their hydrogenated or otherwise modified derivatives, as well as the novel margarines and shortenings prepared from these directedly interesterified liquid glyceride mixtures are also features of the invention.

Liquid oils which are preferably interesterified by the process of the invention are those containing substantial proportions of so called essential fatty acids and a low percentage of saturated fatty acids.

An important representative of the dietetically beneficial essential fatty acids is cis-9, cis-12 octadecadienoic acid (linoleic acid).

Especially the liquid oils containing at least 40% of essential fatty acids and not more than 20% of saturated fatty acids based on the total amount of fatty acids are preferred.

Representatives of this class of oils are, e.g., sunflower oil, safflower oil, soybean oil, wheat germ oil, grapeseed oil, poppyseed oil, tobacco seed oil, rye oil, walnut oil or corn oil.

Plastic margarines can be prepared from the directedly interesterified oils of the invention of a ratio of polyunsaturated to saturated fatty acids of 4.5 and even more.

Such margarines can contain essentially only 75-85% of the directedly interesterified oil and 15-25% of a suitable margarine-aqueous phase.

Margarines of the latter type can be prepared, e.g., from directedly interesterified sunflower oil, which has been cycled for 24 hours at temperatures of $-5°$ and $+10°C$ for periods of 30 minutes and 4 hours respectively.

The ratio of essential fatty acids to saturated fatty acids of such a margarine is about 5.3.

The expression "aqueous phase" as used in this specification refers to water or to water containing the usual water-soluble additives solubilized therein, which is the minor phase of the water-in-oil emulsions (margarines) of the invention.

The aqueous phase can contain water, salt, potassium sorbate, flavour, soybean proteins, or milk in the form of whole milk, cream, skim milk, or reconstituted skim milk.

If the triglycerides which are treated according to the present invention are oils containing catalyst poisons (e.g., water and free fatty acids) in such proportions that a substantial proportion of the catalyst supplied is inactivated, at least the major part of such poisons should be removed before the catalyst is added, because the effect of using greater quantities of catalysts to compensate for the presence of substantial quantities of catalyst poisons may lead to an unacceptably high viscosity of the oil/soap mixture, blocking of filters with soap gel, soap formation on the inner wall of the reactor and a considerable reduction in reaction rate.

The proportions of catalyst mentioned before are based on glyceride mixtures which are free from catalyst poisons. If, even after a pre-treatment to remove such poisons, minor proportions of catalyst poisons still remain in the oil, so much more catalyst should be added to compensate for the catalyst poisons. Thus, when a crude oil mixture having, e.g., an acid value of 2-5 and an amount of water exceeding 0.05% is interesterified, the weight of catalyst should be increased by at least 0.3% to complete interesterification, but then undesirable side effects may still occur. Since water and free acids are the principal catalyst poisons, it is therefore preferred to carefully neutralize the mixture to be interesterified and to reduce the water content to a level of below 0.05%, preferably below 0.015%, and in particular below 0.01%, before interesterification.

Although the drying step can be effected in several ways, when a deacidification process by distillation is carried out, as is usual in the edible oils industry, supplementary drying is not as a rule necessary for the purpose of the present invention. Drying can alternatively be effected by treating the mixture at an elevated temperature with a dry inert gas.

However, drying is preferably carried out by means of an apparatus in which a reduced pressure of, e.g., 10 to 50 mm mercury and an elevated temperature of, e.g., 100° to 140°C are maintained, the heated mixture of glycerides being atomised at the top of a chamber of the apparatus in which a vacuum is maintained to effect rapid evaporation of most of the water present. The operation can be carried out, if desired, in two or more stages. It has been found good results are obtained by means of a double-stage vacuum drying apparatus working at pressures of 45 and 10 mm mercury respectively, for an oil inlet temperature of 125° to 140°C.

The temperature of the liquid to be atomised and the vacuum conditions are so chosen that the moisture content of the product to be interesterified is below the above-mentioned percentages.

Prior to interesterification ester mixtures are also preferably deacidified to an acid value of less than 0.3, preferably less than 0.1. By "acid value" is to be understood the number of milligrammes of potassium hydroxide required to neutralize 1 g of the mixture to be interesterified. The acid value is determined by the process described by H. A. Boekenoogen, "Analysis and Characterization of Oils, Fats and Fat Products," Volume I, 1964, Interscience Publishers, London, pp. 23-24. Since this determination is carried out at ambient temperature in a short space of time, the esters are not saponified, so that an acid value of 0 is obtained in the absence of free acids. The mixture to be interesterified can be deacidified by using a process of deacidification by distillation in vacuo, but it can also be effected by direct contact with an alkaline solution, by which soaps are formed which can be separated by the difference in specific gravity between the oil and the soap. Such alkali deacidification can be carried out by means of an 0.2 to 8N sodium hydroxide solution.

Deacidification can be carried out continuously in centrifugal apparatus which ensure a brief period of contact between the oil and the alkali solution. Moreover, continuous deacidification can also be carried out by mixing the product rapidly with the alkaline solution, then washing the mixture in a packed column. However, deacidification is preferably carried out by passing the oil to be deacidified concurrently or countercurrently through a packed column filled with the alkaline solution, if necessary at a raised pressure and at a temperature of 80° to 160°C, while the oil constitutes the dispersed phase. Such deacidification processes are described in Dutch Pat. application Nos. 6503471 and 6603470.

The process according to the invention will now be illustrated by the following Examples, in which the solid phase analysis was made as follows:

NMR analysis:

The solid phase content of the directedly interesterified glyceride mixture was determined by means of white line nuclear magnetic resonance analysis (NMR) following the procedure described in J.A.O.C.S. 1971 (48), page 7, by A. J. Haighton, L. F. Vermaas and C. den Hollander.

Before measuring the samples were stabilized for 16 hours at −5°C instead of 90 minutes at 0°C and the first measuring temperature was 0°C.

The samples to be analysed were taken as follows:

After removing a forerun via the pointed part of the vessel, approx. 20 g sample were collected in an ice-cooled glass beaker. Some droplets of water were added and intensively stirred with a spatula in order to inactivate the catalyst. Subsequently the mixture was taken up in light petroleum. The solution was boiled on a waterbath after which the formed soap was filtered off through a folding filter. The light petroleum of the filtrate was evaporated under a nitrogen flow on a water bath.

EXAMPLES 1 – 3

A neutralised sunflower oil was washed with a 0.1N NaOH solution.

The oil was dried in vacuo under nitrogen at 130°C for 1 h. Subsequently the oil was cooled to less than 100°C, after which the interesterification catatlyst was added as a fine suspension of sodium in paraffin oil. When the catalyst was dissolved (browning of the mixture), the whole mixture was transferred to a double-walled vessel for directed interesterification. The experiments of Examples 1 and 2 were continued for 24 h, of Example 3 for 48 h. The interesterification vessel was kept at −5°C for 30 min. then at the higher temperature for 4 h, subsequently again at −5°C for 30 min etc.

In comparative examples, controls a, b and c, corresponding to Examples 1, 2 and 3 respectively, the vessel was only kept at −5°C in the first 30 min, after which the mixture was brought at the higher temperature.

The results are shown in Table I.

The cloud point of the randomized mixture determined according to the cloud test of A.O.C.S. Official Method Ce 6-25 was −1.3°C.

From the figures compiled in Table I it can be concluded that the solids contents of the directedly interesterified oils of the invention are appreciably higher than those of control samples.

Since control sample c (after 48 hours) contains in general less solid phase than Example 2 (after 24 hours) it can be said that by applying the process of the invention a reduction in reaction time of at least 50% can be achieved.

EXAMPLES 4 and 5

Example 1 was repeated under identical conditions except that for the highest temperature +5°C (Example 4) and +15°C (Example 5) respectively were chosen.

The results are shown in Table 2, in which for comparison also the results of Examples 1 and 2 are summarized.

Cycling sunflower oil between −5°C and +10°C, i.e., 3.7°C below and 11.3°C above the cloud point of the randomized mixture gave the best results.

EXAMPLE 6

Example 2 was repeated except that the frequency of cycling was 30 min at −5°C and 1 hour at 10°C. The results are shown in Table 3, in which for comparison also the results of Example 2 are summarized.

EXAMPLE 7

Example 2 was repeated except that the catalyst concentration was reduced from 0.25 to 0.10%. The results together with those of Example 2 are shown in Table 4.

EXAMPLE 8

Lard which was refined as described in Example 1 was subjected to a directed interesterification at temperatures varying from 20° to 34°C. (The cloud point of randomized lard being 28°C.) The reaction was carried out at the temperatures referred to above, following the procedure described in Example 1 with the exception that the reaction was completed in 2 hours and that the time required for one cycle was 30 minutes (i.e., for 20 minutes above 28°C and about 8 minutes below 28°C).

In a comparative example the procedure described in U.S. Pat. No. 2,733,251 (Example 3) was repeated, using however 0.25% of sodium suspended in paraffin oil.

The latter reaction was also stopped after 2 hours. From Table 5, in which the results are compiled, it can be concluded that of the directedly interesterified mixture prepared according to the invention the cloud point as well as the dilatation values are the highest.

The dilatation values were determined by the procedure described in Boekenoogen "Analysis and Characterization of Oils, Fats and Fat Products," 1964, Interscience Publishers, London, pp. 143-145.

EXAMPLE 9

A margarine was prepared following the procedure described in British Pat. No. 1,190,553 from 82 parts by weight of the interesterified sunflower oil of Example 2 and 18 parts by weight of an aqueous phase consisting of 50% of water and 50% skim milk.

The margarine had the following characteristics:
1. Dilatation values at
   5°C — 165
   15°C — 120
   25°C — 70
   30°C — 55
   35°C — 20
2. Essential fatty acid content 63.5% Saturated fatty acid content 12.0%
3. Hardness values (determined by the method of Haighton published in J.Am. Oil Chem. Soc. 36 (1959), pp. 345-348): at
   5°C — 104 g/cm$^2$
   10°C — 73 g/cm$^2$
   15°C — 60 g/cm$^2$
   20°C — 47 g/cm$^2$

EXAMPLE 10

Safflower oil was pumped continuously from a stirred interesterification vessel at 0°C through two scraped coolers, kept at −9°C and −3°C respectively. The residence time in the interesterification vessel was 90 minutes and in the coolers 45 minutes each. The coolers were "Chemtec"-coolers (ex R.M. Armstrong Co. Westchester, Pa., U.S.A.) provided with a strongly rotating shaft (27 rpm). Before interesterification the oil was dried to a water content below 0.01% at 125°C and 10 mm Hg by spraying the hot oil in a continuous dryer, mixed with 0.15% of a sodium suspension and chilled to 50°C in a heat exchanger.

After every 12, 24, 36, 48, 60, 72, 84 and 93 hours samples were taken in which the solid phase contents were determined with NMR. In Table 6 the solid phase contents measured at different temperatures are given.

After 93 hours the reaction was stopped by the addition of 20% ice water (with 5% NaCl). From this mixture about 4 kg was isolated for fractionation. To that end the oil/water mixture was cooled overnight at 0°C and subsequently centrifuged batchwise at 0°C at a speed of 5000 rpm. The oil yield was about 80%. The fatty acid composition of the original oil and the olein fraction are given in Table 7.

Although in previous Examples 1–10 directed interesterification processes were described using sodium as an interesterification catalyst, other catalysts can be used without adversely affecting the reaction rate accelerating effect of cycling the reaction temperature, e.g. potassium or a potassium/sodium alloy as well as alkali metal hydroxides and alkoxides like sodium ethylate or methylate.

TABLE 1

Influence of cycling the temperature on the directed interesterification of sunflower seed oil

| Example | 1 | control a | 2 | 3 | control b | control c |
|---|---|---|---|---|---|---|
|  | Cycling 30 min at −5°C 4 h 0°C | Chilling 30 min at −5°C afterwards constantly at 0°C | Cycling 30 min at −5°C 4 h at 10°C |  | Chilling 30 min at −5°C afterwards constantly at 10°C |  |
| Time | 24 h | 24 h | 24 h | 48 h | 24 h | 48 h |
| Cat. conc. | 0.25% | 0.25% | 0.25% | 0.25% | 0.25% | 0 .25% |
| Percentage of solid phase (NMR, stabilization 16 h at −5°C) | | | | | | |
| 0°C | 11.2% | 5.8% | 8.4% | 10.4% | 5.3% | 8.0% |
| 5 | 9.5 | 4.8 | 7.0 | 9.6 | 5.0 | 7.6 |
| 10 | 7.5 | 1.3 | 7.0 | 8.8 | 2.0 | 5.1 |
| 15 | 5.4 | — | 5.1 | 7.3 | 1.4 | 3.7 |
| 20 | 4.1 | — | 4.6 | 6.8 | 1.3 | 3.5 |
| 25 | 2.6 | — | 3.8 | 6.1 | 1.2 | 2.1 |
| 30 | 2.4 | — | 4.1 | 4.0 | 1.0 | 2.5 |
| 35 | 1.7 | — | 2.6 | 3.1 | — | 0.7 |
| Cloud point (A.O.C.S. Official Method Ce 6-25 | 19.4°C | 4.5°C | 24.8°C | 25.2°C | 15.3°C | 20.2°C |

TABLE 2

Influence of the interesterification temperature on the directed interesterification of sunflower seed oil with cycling temperature

| Example | 1 | 4 | 2 | 5 |
|---|---|---|---|---|
| Cycling | 30 min at −5°C 4 h at 0°C | 30 min at −5°C 4 h at +5°0 | 30 min at −5°C 4 h at +10°0 | 30 min at −5°C 4 h at +15°C |
| Cat. conc. | 0.25% | 0.25% | 0.25% | 0.25% |
| Time | 24 h | 24 h | 24 h | 24 h |
| Percentage of solid phase | | | | |
| 0°C | 11.2 | 8.0 | 8.4 | 6.3 |
| 5 | 9.5 | 6.6 | 7.0 | 6.1 |
| 10 | 7.5 | 5.7 | 7.0 | 6.1 |
| 15 | 5.4 | 2.9 | 5.1 | 4.1 |
| 20 | 4.1 | 2.5 | 4.6 | 4.0 |
| 25 | 2.6 | 1.4 | 3.8 | 3.4 |
| 30 | 2.4 | 1.4 | 4.1 | 3.2 |
| 35 | 1.7 | — | 2.6 | 2.1 |
| Cloud point | 19.4°C | 12.7°C | 24.8°C | 20.2°C |

TABLE 3

Influence of the number of cyclings per unit of time on the directed interesterification of sunflower seed oil

| Example | 2 | 6 |
|---|---|---|
| Cycling | 30 min at −5°C 4 h at 10°C | 30 min at −5°C 1 h at 10°C |
| Cat. | 0.25% | 0.25% |
| Time | 24 h | 24 h |
| Percentage of solid phase | | |
| 0°C | 8.4% | 8.4% |
| 5 | 7.0 | 7.6 |
| 10 | 7.0 | 6.2 |
| 15 | 5.1 | 4.8 |
| 20 | 4.6 | 3.0 |
| 25 | 3.8 | 3.3 |
| 30 | 4.1 | 1.4 |
| 35 | 2.6 | 1.3 |
| Cloud point | 24.8°C | 17.0°C |

TABLE 4

Influence of the catalyst concentration on the directed interesterification of sunflower seed oil with cycling temperature

| Example | 2 | 7 |
|---|---|---|
| Cycling | 30 min at −5°C 4 h at +10°C | 30 min at −5°C 4 h at +10°C |
| Cat. conc. | 0.25% | 0.10% |
| Time | 24 h | 24 h |
| Percentage of solid phase | | |
| 0°C | 8.4% | 5.7% |
| 5 | 7.0 | 3.8 |
| 10 | 7.0 | 2.7 |
| 15 | 5.1 | 2.5 |
| 20 | 4.6 | 2.2 |
| 25 | 3.8 | 1.9 |
| 30 | 4.1 | 1.0 |
| 35 | 2.6 | |
| Cloud point | 24.8°C | 5.0°C |

TABLE 5

| | Lard before interesterification | Lard directly interesterified acc. to USP 2,733,251 | Lard directly interesterified acc. to the invention |
|---|---|---|---|
| Cloud point | 28.0°C | 33.1°C | 34.0°C |
| Slip point | 38.7°C | 44.4°C | 45.9°C |
| Dilatation at | | | |
| 20°C | 625 | 710 | 780 |
| 30°C | 250 | 520 | 600 |
| 40°C | 120 | 330 | 420 |

TABLE 6

Amount of crystalline phase (%) present in safflower oil samples analysed by NMR

| Temp. °C | Hours after start of reaction | | | | | | | |
|---|---|---|---|---|---|---|---|---|
| | 12 | 24 | 36 | 48 | 60 | 72 | 84 | 93 |
| 0 | 1.1 | 2.6 | 3.8 | 4.7 | 4.5 | 3.3 | 5.0 | 5.6 |
| 5 | 0.8 | 1.5 | 3.3 | 4.1 | 4.3 | 3.1 | 4.4 | 5.4 |
| 10 | 0.7 | 1.2 | 2.8 | 2.9 | 3.5 | 2.1 | 4.0 | 4.8 |
| 15 | — | 0.7 | 1.1 | 3.1 | 2.4 | 1.9 | 2.2 | 3.4 |
| 20 | — | 0.7 | 1.9 | 3.2 | 2.8 | 2.1 | 2.4 | 3.6 |
| 25 | — | 0.6 | 1.4 | 2.6 | 2.5 | 1.8 | 3.0 | 3.7 |
| 30 | — | 0.2 | 1.1 | 1.9 | 1.7 | 0.9 | 2.3 | 3.1 |
| 35 | — | — | 0.5 | 0.8 | 0.7 | 0.4 | 0.9 | 1.4 |

TABLE 7

Fatty acid composition of the olein fraction from the directedly interesterified safflower oil and the original oil

| number of carbon atoms in fatty acid | 14 | 16 | 18 | 20 | 16:1 | 18:1 | 20:1 | 18:2 | 18:3 |
|---|---|---|---|---|---|---|---|---|---|
| safflower oil | 0.1 | 7.3 | 2.7 | 0.3 | 0.2 | 12.8 | 0.2 | 75.5 | 0.8 |
| safflower oil treated acc. to the invention | trace | 4.0 | 1.6 | 0.4 | trace | 14.2 | 0.3 | 78.3 | 1.2 |

What is claimed is:

1. Process for accelerating the directed interesterification reaction of a mixture of glycerides containing fatty acid radicals with 2 to 26 carbon atoms, in which the reaction is carried out at temperatures from −30° to 60°C in the presence of 0.01 to 0.5% by weight of alkali metals or their catalytically active derivatives under conditions at which the glyceride mixture is alternately subjected for 5 to 60 minutes to a temperature of 1° to 15°C below the cloud point of a randomized mixture of the same glycerides and for 15 to 300 minutes to a temperature of at least the cloud point of said randomized mixture, whereby the temperature is cycled at least three times until the cloud point of the mixture obtained is at least 5°C above the cloud point of the randomized mixture.

2. Process according to claim 1, in which the temperature of the glyceride mixture is cycled until the cloud point of the mixture obtained is at least 10°C above the cloud point of the randomised mixture.

3. Process according to claim 1, in which the glyceride mixture is subjected to alternating temperatures 4 to 15 times.

4. Process according to claim 1, in which a glyceride mixture is used essentially consisting of oils containing at least 40% of essential fatty acids.

5. Process according to claim 4, wherein the glyceride mixture is sunflower oil.

6. Process according to claim 4, wherein the glyceride mixture is safflower oil.

7. Directedly interesterified glyceride mixture prepared by the process of claim 1.

* * * * *